United States Patent
Tamai

(10) Patent No.: US 7,882,273 B2
(45) Date of Patent: Feb. 1, 2011

(54) DATA TRANSFER SYSTEM, DATA TRANSFER METHOD, HOST APPARATUS AND IMAGE FORMING APPARATUS

(75) Inventor: Junichi Tamai, Osaka (JP)

(73) Assignee: NEC System Technologies, Ltd., Osaka (JP)

( * ) Notice: Subject to any disclaimer, the term of this patent is extended or adjusted under 35 U.S.C. 154(b) by 233 days.

(21) Appl. No.: 12/213,380

(22) Filed: Jun. 18, 2008

(65) Prior Publication Data

US 2009/0019189 A1     Jan. 15, 2009

(30) Foreign Application Priority Data

Jun. 28, 2007   (JP) ............................. 2007-171242

(51) Int. Cl.
   *G06F 3/00*   (2006.01)
   *G06F 13/00*  (2006.01)
(52) U.S. Cl. .................. 710/5; 710/3; 710/33; 711/154
(58) Field of Classification Search ........................ None
   See application file for complete search history.

(56) References Cited

U.S. PATENT DOCUMENTS

| | | | |
|---|---|---|---|
| 5,155,822 A * | 10/1992 | Doyle et al. ................. | 711/202 |
| 5,303,334 A * | 4/1994 | Snyder et al. ................ | 358/1.9 |
| 5,999,200 A | 12/1999 | Harkin et al. | |
| 6,219,073 B1 * | 4/2001 | Suzuoki ...................... | 345/538 |
| 6,339,427 B1 * | 1/2002 | Laksono et al. ............. | 345/553 |
| 6,348,919 B1 * | 2/2002 | Murphy ...................... | 345/421 |
| 6,505,017 B2 * | 1/2003 | Fujii et al. .................... | 399/82 |
| 6,587,635 B1 * | 7/2003 | Subramanian et al. ....... | 386/68 |
| 6,789,140 B2 | 9/2004 | Kotani et al. | |
| 7,196,710 B1 | 3/2007 | Fouladi et al. | |
| 2003/0033455 A1 | 2/2003 | Kotani et al. | |
| 2004/0207630 A1 | 10/2004 | Moreton et al. | |
| 2005/0237422 A1 * | 10/2005 | Kido .......................... | 348/362 |

FOREIGN PATENT DOCUMENTS

| JP | 10-269165 | 10/1998 |
|---|---|---|
| JP | 2003-050774 | 2/2003 |

* cited by examiner

*Primary Examiner*—Henry W Tsai
*Assistant Examiner*—Michael Sun
(74) *Attorney, Agent, or Firm*—Foley & Lardner LLP

(57) ABSTRACT

A system capable of efficiently transferring a command set for controlling an image forming apparatus to the image forming apparatus from a host apparatus. A command separate/storage unit separates an image forming command set into a context command set and an object command set, and allocates both command sets in a main memory device. A command read instruction transmission unit transmits a command read instruction having a transfer size and a storage address of each of the allocated context command set and object command set, to the memory access controller. The memory access controller compares the storage address of the context command set included in the received command read instruction with a previous storage address, and reads the context command set from the main memory device only when both storage addresses differ from each other.

6 Claims, 11 Drawing Sheets

(1) COMMAND READ INSTRUCTION105A (2) COMMAND READ INSTRUCTION105C (3) COMMAND READ INSTRUCTION105B (4) COMMAND READ INSTRUCTION105D

MEMORY ACCESS CONTROLLER

DATA TRANSFER SYSTEM, DATA TRANSFER METHOD, HOST APPARATUS AND IMAGE FORMING APPARATUS

BACKGROUND OF THE INVENTION

1. Field of the Invention

The present invention relates to a system and method for transferring a command set for controlling an image forming process from a host apparatus to an image forming apparatus.

2. Description of the Related Art

An image forming apparatus (e.g., a graphics card or the like) which is connected to a personal computer or the like by a bus to achieve an expanded image forming process is well known. Upon reception of a read instruction (including a transfer size and a storage address) for commands (image forming command set) relating to an image forming process from a CPU (host CPU (Central Processing Unit)) of a personal computer or so, the image forming apparatus reads the image forming command set from a main memory device in the personal computer or so according to the contents of the read instruction. Then, the image forming apparatus executes a command process (i.e., image forming process) according to the read image forming command set.

In general, each command (image forming command) in the image forming command set includes a context command and an object command. A context (also called graphics context) command is a command relating to setting or the like of an operation mode needed for image forming. For example, a top address on a memory for each buffer (buffer for outputting an image forming result, buffer for imaging a font, or the like), a pixel size and color format (RGB, YUV or the like), or a color conversion matrix parameters and LUT (LookUp Table), or the like are equivalent to a context command.

An object command is a command relating to setting or the like for specifying an image forming target. For example, coordinate data and coordinate conversion matrix parameters or the like for executing a process for enlargement, reduction, rotation, etc. are equivalent to an object command.

The conventional image forming apparatus reads whole image forming command sets including a context command set from the main memory device one after another. Therefore, the amount of data (transfer size) at the time the image forming apparatus executes single reading is large, which is a factor to prohibit improvements on the efficiency of data transfer.

For example, a technique directed to reducing the load at the time of data transfer relating to transfer of an image forming command set is proposed in Japanese Patent Application Laid-Open No. 2003-50774.

SUMMARY OF THE INVENTION

There are many cases where in a process of reading an image forming command set from a main memory device of a personal computer or so in the image forming apparatus, context commands (context command set) in the read image forming command set become identical plural times successively due to the property of the image forming process. That is, a context command set can be said to have continuity.

However, Japanese Patent Application Laid-Open No. 2003-50774 neither discloses nor suggest a technique of improving the efficiency of data transfer based on the continuity of the context command set.

Accordingly, it is an object of the present invention to provide a data transfer system and a data transfer method which can efficiently transfer a command set for controlling an image forming apparatus from a host apparatus to the image forming apparatus.

To achieve the object, according to the first aspect of the invention, there is provided a data transfer system having a host apparatus and an image forming apparatus connected thereto by a bus, the host apparatus including a memory device; a command separate/storage unit that separates an image forming command set including a plurality of image forming commands for controlling an image forming process in the image forming apparatus into a context command set including a plurality of commands relating to a context in the image forming process, and an object command set including a plurality of commands relating to an object in the image forming process, and stores the context command set and the object command set in the memory device; and a command read instruction transmission unit that transmits a command read instruction including a transfer size of each of the context command set and the object command set, and a storage address thereof in the memory device to the image forming apparatus, the image forming apparatus including a memory access controller that receives the command read instruction, and reads the context command set and the object command set from the memory device according to a content of the command read instruction, the memory access controller having a command information hold unit that holds the storage address of the context command set included in the command read instruction received, and the read context command set, upon reception of the command read instruction, comparing the storage address of the context command set included in the command read instruction with a storage address of a previous context command set held in the command information hold unit, and reading the context command set from the memory device according to the storage address of the context command set relating to present reception when both of the storage addresses differ from each other.

According to the second aspect of the invention, there is provided a data transfer method for controlling data transfer between a host apparatus and an image forming apparatus connected together by a bus, the method comprising a command separate/storage step of separating an image forming command set including a plurality of image forming commands for controlling an image forming process in the image forming apparatus into a context command set including a plurality of commands relating to a context in the image forming process, and an object command set including a plurality of commands relating to an object in the image forming process, and storing the context command set and the object command set in the memory device; a command read instruction transmission step of transmitting a command read instruction including a transfer size of each of the context command set and the object command set, and a storage address thereof in the memory device to the image forming apparatus; and a memory access control step of receiving the command read instruction, and reading the context command set and the object command set from the memory device according to a content of the command read instruction, in the memory access control step, upon reception of the command read instruction, the storage address of the context command set included in the command read instruction being compared with a storage address of a previous context command set included in a command read instruction received previously, and the context command set being read from the memory device according to the storage address of the context command set relating to present reception when both of the storage addresses differ from each other.

According to the third aspect of the invention, there is provided a host apparatus including a memory device; a command separate/storage unit that separates an image forming command set including a plurality of image forming commands for controlling an image forming process in an image forming apparatus, connected to the host apparatus by a bus, into a context command set including a plurality of commands relating to a context in the image forming process, and an object command set including a plurality of commands relating to an object in the image forming process, and stores the context command set and the object command set in the memory device which the host apparatus includes; and a command read instruction transmission unit that transmits a command read instruction including a transfer size of each of the context command set and the object command set, and a storage address thereof in the memory device to the image forming apparatus.

According to the fourth aspect of the invention, there is provided an image forming apparatus including a memory access controller that receives a command read instruction from a host apparatus connected to the image forming apparatus by a bus, and reads a context command set and an object command set forming an image forming command set from a memory device provided in the host apparatus according to a content of the command read instruction, the command read instruction including a transfer size of each of the context command set and the object command set and a storage address thereof in the memory device, the memory access controller having a command information hold unit that holds the storage address of the context command set included in the command read instruction received, and the read context command set, upon reception of the command read instruction, comparing the storage address of the context command set included in the command read instruction with a storage address of a previous context command set held in the command information hold unit, and reading the context command set from the memory device according to the storage address of the context command set relating to present reception when both of the storage addresses differ from each other.

BRIEF DESCRIPTION OF THE DRAWINGS

These objects and other objects and advantages of the present invention will become more apparent upon reading of the following description and the accompanying drawings in which.

DETAILED DESCRIPTION OF THE PREFERRED EMBODIMENTS

Preferred embodiments of a data transfer system according to the present invention will be described below with reference to the accompanying drawings.

First Embodiment

Figure 1:
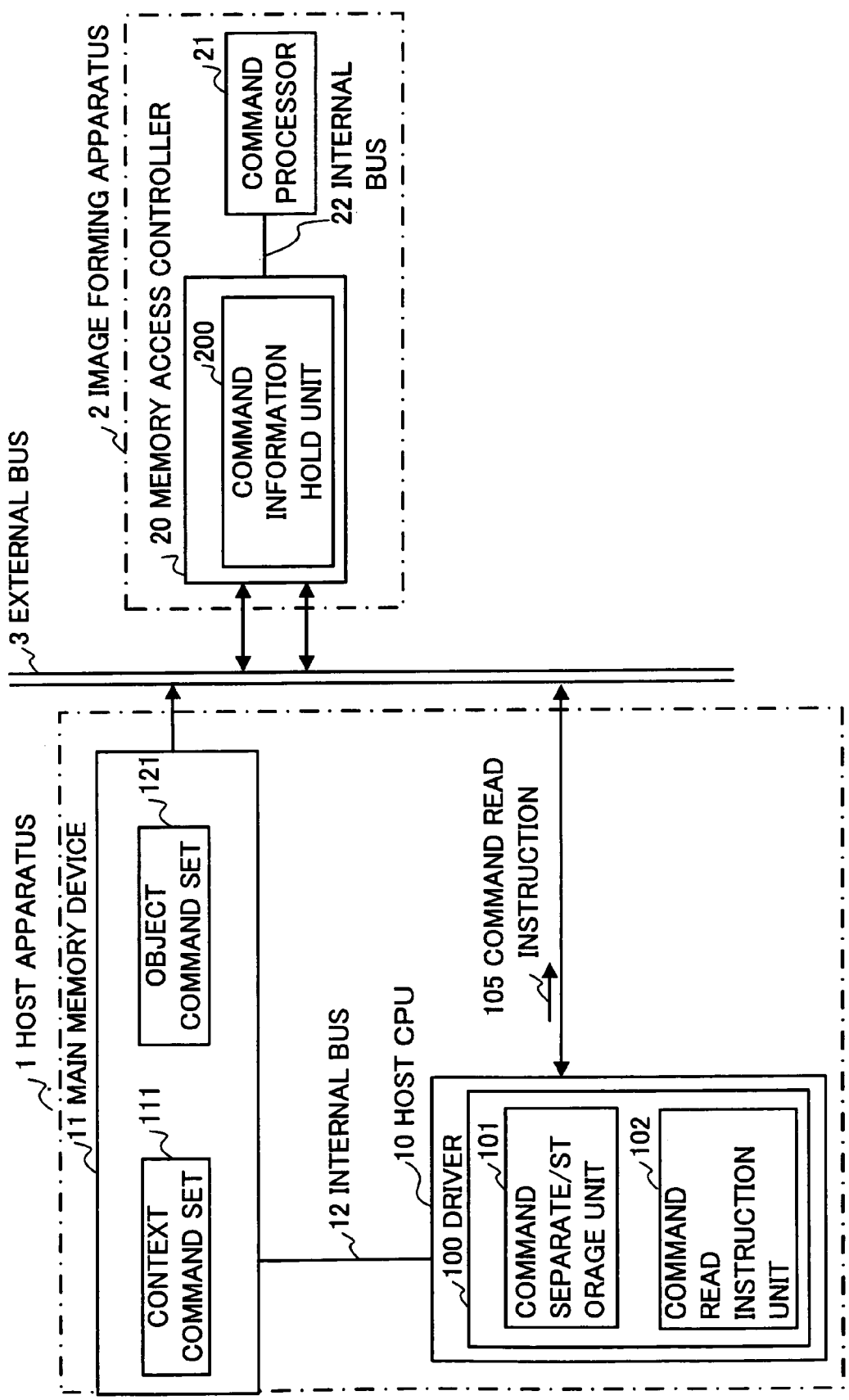
FIG. 1 is a diagram showing the general configuration of a data transfer system according to a first embodiment of the invention.

FIG. 1 is a diagram showing the general configuration of a data transfer system according to a first embodiment of the invention. The data transfer system according to the embodiment includes a host apparatus 1, such as a personal computer, and an image forming apparatus 2, such as a graphics card, which is connected to the host apparatus 1 by an external bus 3.

The host apparatus 1 has a host CPU 10 and a main memory device 11. The main memory device 11 is connected to the host CPU 10 by an internal bus 12. The image forming apparatus 2 has a memory access controller 20 and a command processor 21. The command processor 21 is connected to the memory access controller 20 by an internal bus 22.

The host CPU 10 controls the host apparatus 1, and controls the image forming apparatus 2 to execute an image forming process. The host CPU 10 has a driver 100 which controls the image forming apparatus 2. The driver 100 has a command separate/storage unit 101 and a command read instruction transmission unit 102.

At the time the image forming apparatus 2 executes a specific image forming process, the command separate/storage unit 101 separates an image forming command set 110 (see FIG. 2) corresponding to the image forming process into a context command set 111 and an object command set 121. Then, the command separate/storage unit 101 stores (locates) the context command set 111 and the object command set 121 in respectively determined areas in the main memory device 11 via the internal bus 12. Such a process of the command separate/storage unit 101 to separate an image forming command set 110 and store individual separated command sets (context command set 111 and object command set 121) in the main memory device 11 after separation is generally called "command separation/storage process".

Figure 2:
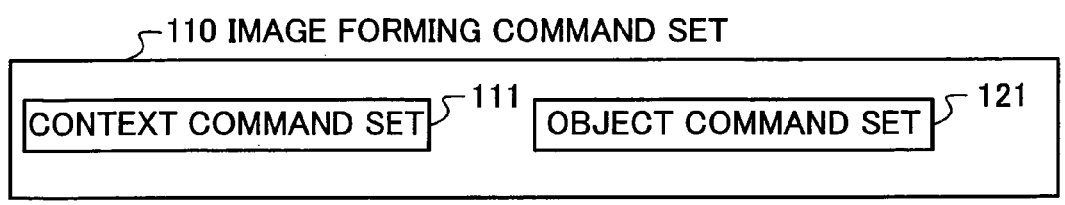
FIG. 2 is a diagram showing the structure of an image forming command set.

The image forming command set 110 shown in FIG. 2 is a set of a plurality of commands (image forming commands) relating to an image forming process to be executed by the image forming apparatus 2. An image forming command includes a context command and an object command. A context command is a command relating to setting or the like of an operation mode needed for image forming. For example, a top address on a memory for each buffer (buffer for outputting an image forming result, buffer for imaging a font, or the like), a pixel size and color format (RGB, YUV or the like), or a color conversion matrix parameters and LUT (LookUp Table), or the like are equivalent to a context command. An object command is a command relating to setting or the like for specifying an image forming target. For example, coordinate data and coordinate conversion matrix parameters or the like for executing a process for enlargement, reduction, rotation, etc. are equivalent to an object command.

The context command set 111 is a set of a plurality of context commands, and the object command set 121 is a set of a plurality of object commands.

Figure 3A:
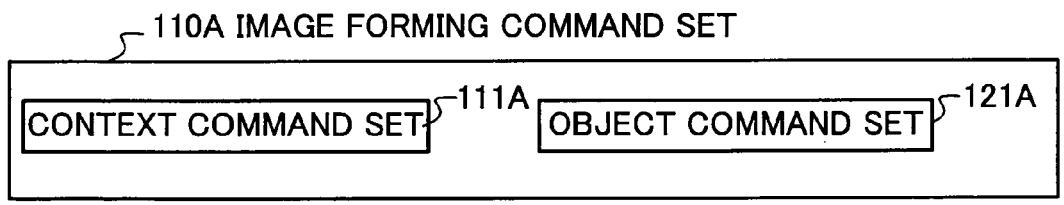
FIGS. 3A and 3B are diagrams showing one example of the structure of an image forming command set according to the first embodiment.
Figure 3B:
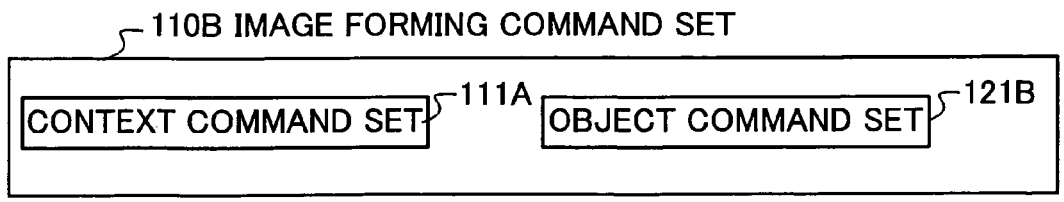

The command separation/storage process which is carried out by the command separate/storage unit 101 will be described in detail referring to FIGS. 3 and 4. A description will be given of a case where, for example, an image forming command set corresponding to the first image forming process to be executed by the image forming apparatus 2 is an image forming command set 110A shown in FIG. 3A, and an image forming command set corresponding to an image forming process to be executed next is an image forming command set 110B shown in FIG. 3B. First, the command separate/storage unit 101 separates the image forming command set 110A into a context command set 111A and an object command set 121A. Then, the command separate/storage unit 101 stores the command sets in respectively determined areas (context command set storage area, and object command set storage area) in the main memory device 11.

Next, the command separate/storage unit 101 separates the image forming command set 110B into a context command set 111B and an object command set 121B. Because the context command set 111A has already been stored in the main memory device 11, the command separate/storage unit 101 stores only the object command set 121B in the main memory device 11. As a result, as shown in FIG. 4, the context command set 111A, the object command set 121A and the object command set 121B are stored in the main memory device 11.

As a needless process of successively restoring (relocating) the same context command set 111 is avoided in the command separation/storage process to be executed by the command separate/storage unit 101, the efficiency of allocating command sets in the main memory device 11 is improved. Since the context command set 111 is not stored in duplication, the capacity (memory size) of the main memory device 11 can be reduced.

Figure 5:
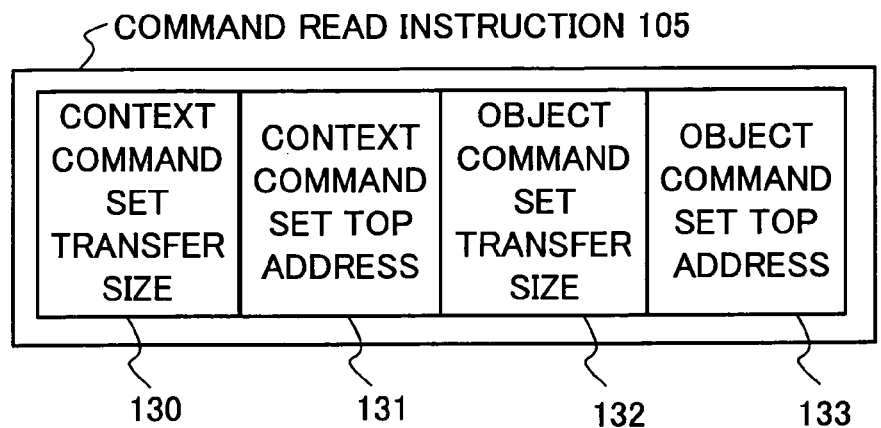
FIG. 5 is a diagram showing the structure of a command read instruction.

Next, a description will be given of a command read instruction transmission process to be executed by the command read instruction transmission unit 102. When allocation of command sets in the main memory device 11 by the command separate/storage unit 101 is completed, as shown in FIG. 1, the command read instruction transmission unit 102 issues a command read instruction 105 to the image forming apparatus 2 via the external bus 3. As shown in FIG. 5, the command read instruction 105 includes a context command set transfer size 130, a context command set top address 131, an object command set transfer size 132, and an object command set top address 133.

The context command set transfer size 130 indicates the size (number of bytes) of the context command set 111 stored in the main memory device 11. The context command set top address 131 indicates a top address in the memory area in the main memory device 11 where the context command set 111 is to be stored. Likewise, the object command set transfer size 132 indicates the size of the object command set 121 stored in the main memory device 11. The object command set top address 133 indicates a top address in the memory area in the main memory device 11 where the object command set 121 is to be stored.

Figure 4:
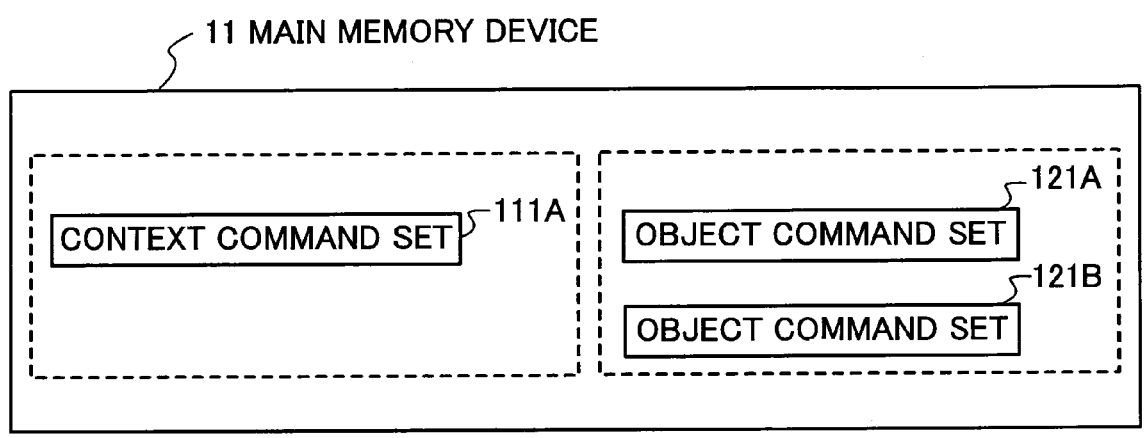
FIG. 4 is a diagram showing one example of allocation of command sets in a main memory device according to the first embodiment.
Figure 6A:
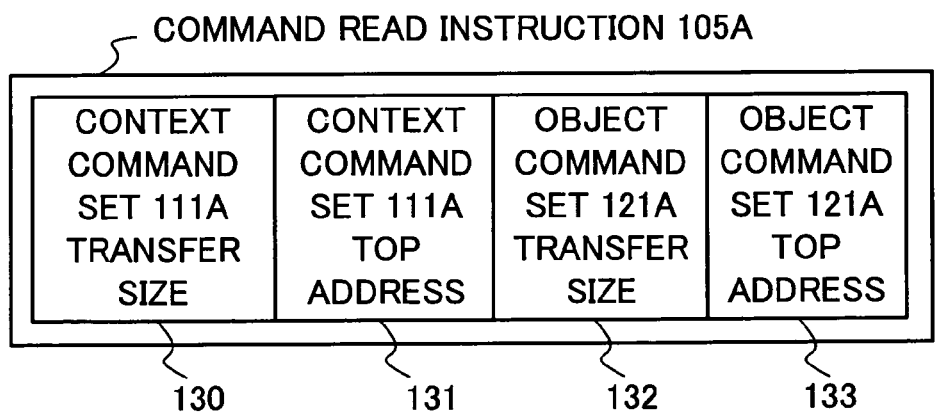
FIGS. 6A and 6B are diagrams showing one example of the structure of the command read instruction according to the first embodiment.
Figure 6B:
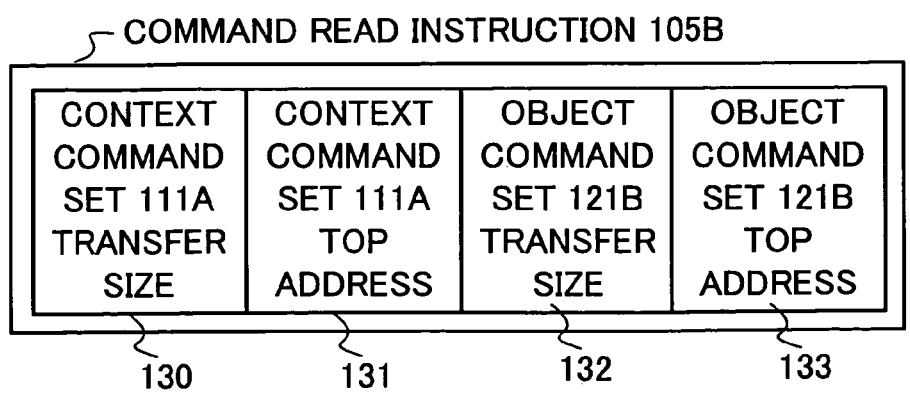

When the allocation of command sets in the main memory device 11 is as shown in FIG. 4, for example, the driver 100 issues a command read instruction 105A shown in FIG. 6A and a command read instruction 105B shown in FIG. 6B to the image forming apparatus 2.

Returning to FIG. 1, a description will now be given of a memory access control process which is executed by the memory access controller 20 of the image forming apparatus 2. The command sets (context command set 111 and object command set 121) stored in the main memory device 11 are transferred to the image forming apparatus 2 in the DMA (Direct Memory Access) mode. Upon reception of the command read instruction 105 from the command read instruction transmission unit 102, the main memory device 11 directly accesses the main memory device 11 to read the context command set 111 and the object command set 121 according to the contents of the command read instruction 105. The context command set 111 and the object command set 121 read by the memory access controller 20 are sent to the command processor 21 via the internal bus 22. Then, the command processor 21 executes a command process (i.e., image forming process) according to the context command set 111 and the object command set 121 read by the memory access controller 20.

The memory access control process by the memory access controller 20, which is a unique process of the present invention, does not read the context command set 111 when the context command set 111 specified to be read in the command read instruction 105 is identical to the previously read context command set 111. This unique process will be described below.

Figure 7:
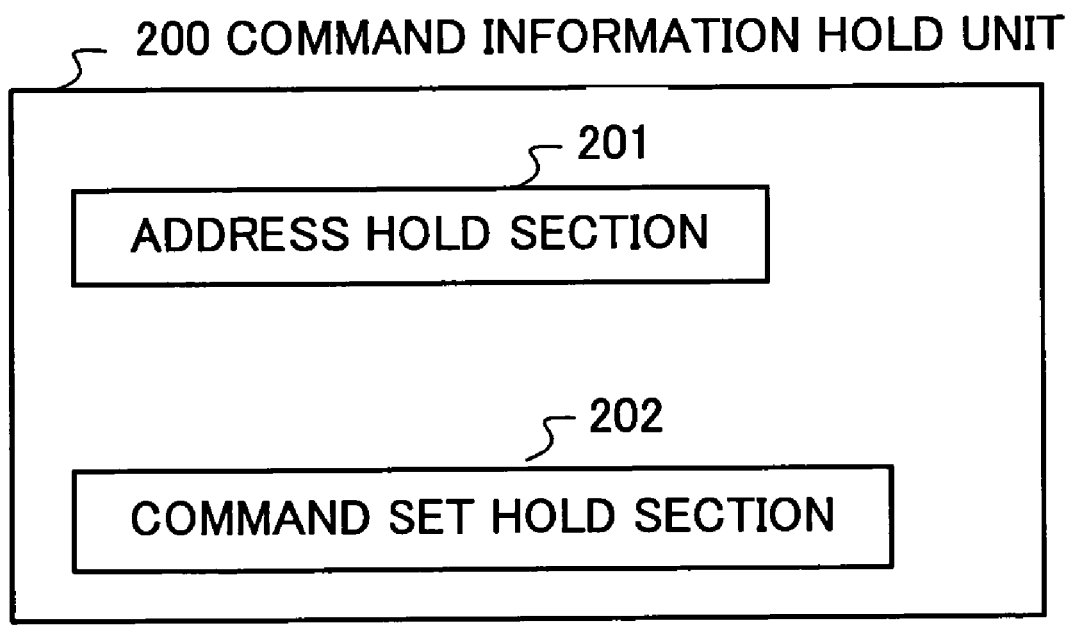
FIG. 7 is a diagram showing the configuration of a command information hold unit.

The memory access controller 20 is provided with a command information hold unit 200 which holds the address value of the context command set top address 131 in the command read instruction 105, received by the memory access controller 20, and the context command set 111 read from the main memory device 11 by the memory access controller 20. As shown in FIG. 7, the command information hold unit 200 has an address hold section 201 and a command set hold section 202.

The address hold section 201 is a register for holding an address value indicated by the context command set top address 131 in the received command read instruction 105. The command set hold section 202 is a fast semiconductor memory, such as SRAM (Static RAM) for holding the context command set 111 read from the main memory device 11.

Upon reception of the command read instruction 105 from the command read instruction transmission unit 102, the memory access controller 20 first acquires the address value (current address value) indicated by the context command set top address 131 in the command read instruction 105. Then, the memory access controller 20 compares the current address value acquired with the address value held in the address hold section 201 (i.e., address value indicated by the context command set top address 131 in the previously received command read instruction 105).

When the comparison results in unmatch between both address values, the memory access controller 20 acquires the number of bytes of the context command set transfer size 130 in the received command read instruction 105. Then, the memory access controller 20 accesses the main memory device 11 and reads the acquired number of bytes of data from the current address value to acquired the context command set 111.

When both address values match with each other, on the other hand, the memory access controller 20 determines that reading of the context command set 111 from the main memory device 11 is unnecessary. In this case, the memory access controller 20 sends the context command set 111 held in the command set hold section 202 to the command processor 21.

The memory access control process by the memory access controller 20 will be further described by way of specific example. A description will be given of a case where, for example, allocation of the command sets in the main memory device 11 is as shown in FIG. 4, the command read instruction 105A shown in FIG. 6A is issued to the image forming apparatus 2, and then the command read instruction 105B shown in FIG. 6B is issued.

First, the memory access controller 20 performs a process relating to the command read instruction 105A. The memory access controller 20 acquires an address value indicated by the context command set top address 131 in the command read instruction 105A (i.e., address value of the context command set 111A) as a current address. Then, the memory access controller 20 compares the acquired current address value with the address value held in the address hold section 201 (previous address value). In this case, the command read instruction 105A is the first command read instruction, so that both address values do not match with each other (previous address value is "NULL").

Therefore, the memory access controller 20 accesses the main memory device 11 to read the context command set 111A. The memory access controller 20 stores the read context command set 111A in the command set hold section 202 of the command information hold unit 200, and stores the current address value in the address hold section 201. Next, the memory access controller 20 accesses the main memory device 11 to read the object command set 121A. The context command set 111A and object command set 121A read from the main memory device 11 by the memory access controller 20 are sent to the command processor 21.

Next, the memory access controller 20 performs a process relating to the command read instruction 105B. As in the process relating to the command read instruction 105A, the memory access controller 20 acquires an address value indicated by the context command set top address 131 in the command read instruction 105B (i.e., address value of the context command set 111A) as a current address. Then, the memory access controller 20 compares the acquired current address value with the previous address value held in the address hold section 201. In this case, both address values match with each other, so that the memory access controller 20 does not read the context command set 111A, and reads only the object command set 121B from the main memory device 11. Then, the memory access controller 20 acquires the context command set 111A from the command set hold section 202, and sends the context command set 111A and the object command set 121B, read from the main memory device 11, to the command processor 21.

As apparent from the above, because the same context command set 111 need not be read successively in the memory access control process by the memory access controller 20, the efficiency of reading command sets from the main memory device 11 (i.e., data transfer efficiency) is improved.

Figure 8:
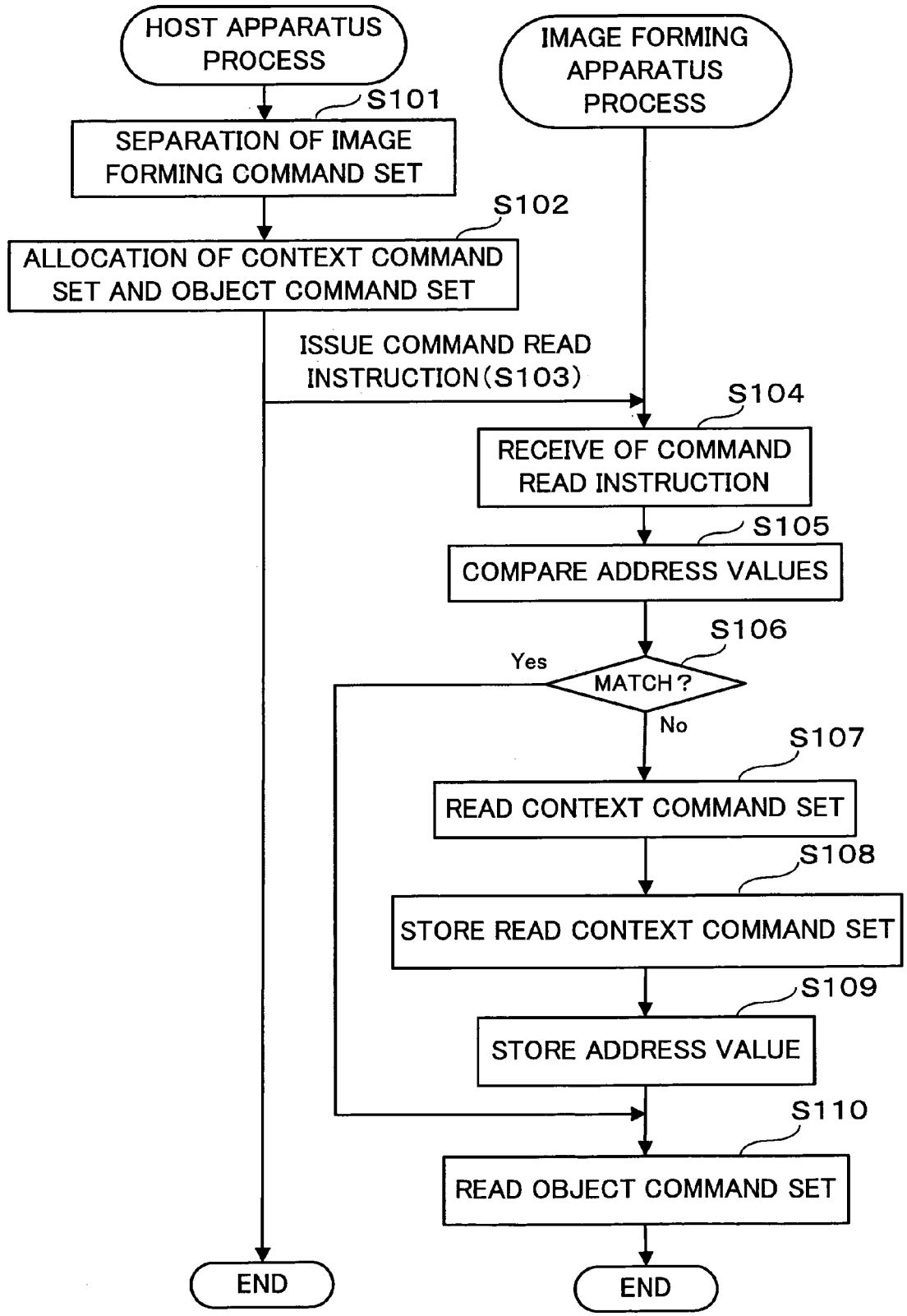
FIG. 8 is a flowchart illustrating procedures of a data transfer control process.

Next, referring to a flowchart in FIG. 8, a description will be given of procedures of a data transfer control process (a sequence of processes including the foregoing command separation/storage process, command read instruction transmission process and memory access control process) which is executed by the data transfer system according to the embodiment. When conditions (various parameters) for an image forming process and an instruction to start the image forming process are input by a user via the input unit (not shown) of the host apparatus 1, the control of the image forming apparatus 2 by the host CPU 10 is initiated. The data transfer control process is started after the host CPU 10 generates an image forming command set.

First, the command separate/storage unit 101 separates the image forming command set into a context command set 111 and an object command set 121 (step S101). Next, the command separate/storage unit 101 stores (locates) the context command set 111 and the object command set 121 in the respectively determined areas in the main memory device 11 via the internal bus 12 (step S102). At this time, the command separate/storage unit 101 checks if the context command set 111 separated in step S101 has already been allocated in the main memory device 11, and does not allocate the context command set 111 and allocates only the object command set 121 when the check is affirmative.

When the allocation of the command sets is completed, the command read instruction transmission unit 102 issues a command read instruction 105 to the image forming apparatus 2 (step S103). Upon reception of the command read instruction 105 (step S104), the memory access controller 20 of the image forming apparatus 2 acquires an address value (current address value) indicated by the context command set top address 131 in the command read instruction 105. The memory access controller 20 also acquires an address value (previous address value) held in the address hold section 201 of the command information hold unit 200. Then, the memory access controller 20 compares the current address value with the previous address value (step S105).

When both address values do not match each other (step S106; No), the memory access controller 20 reads the context command set 11 from the main memory device 11 using the number of bytes of the context command set transfer size 130 in the received command read instruction 105 and the current address value (step S107). The memory access controller 20 stores the read context command set 111 in the command set hold section 202 of the command information hold unit 200 (step S108). The memory access controller 20 also stores the current address value in the address hold section 201 of the command information hold unit 200 (step S109). When both address values match each other (step S106; Yes), on the other hand, the memory access controller 20 does not read the context command set 111, and proceeds to a process of step S110.

When Yes in step S106, or after the process of step S109, the memory access controller 20 acquires the number of bytes of the object command set transfer size 132 and an address value indicated by the object command set top address 133 from the received command read instruction 105. Then, the memory access controller 20 reads the object command set 121 from the main memory device 11 using the acquired number of bytes and address value (step S110).

Through the foregoing data transfer control process, the context command set 111 and the object command set 121 acquired by the memory access controller 20 are sent to the command processor 21. Then, the command processor 21 executes a command process (i.e., image forming process) according to the received context command set 111 and object command set 121.

According to the data transfer system of the embodiment, as described above, command sets (context command set 111, object command set 121) for controlling the image forming apparatus 2 can be efficiently transferred to the image forming apparatus 2 from the host apparatus 1.

The individual processes in the foregoing flowchart are not limited to the procedure order, which can be changed optionally without departing from the scope and spirit of the present invention.

Second Embodiment

Figure 9:
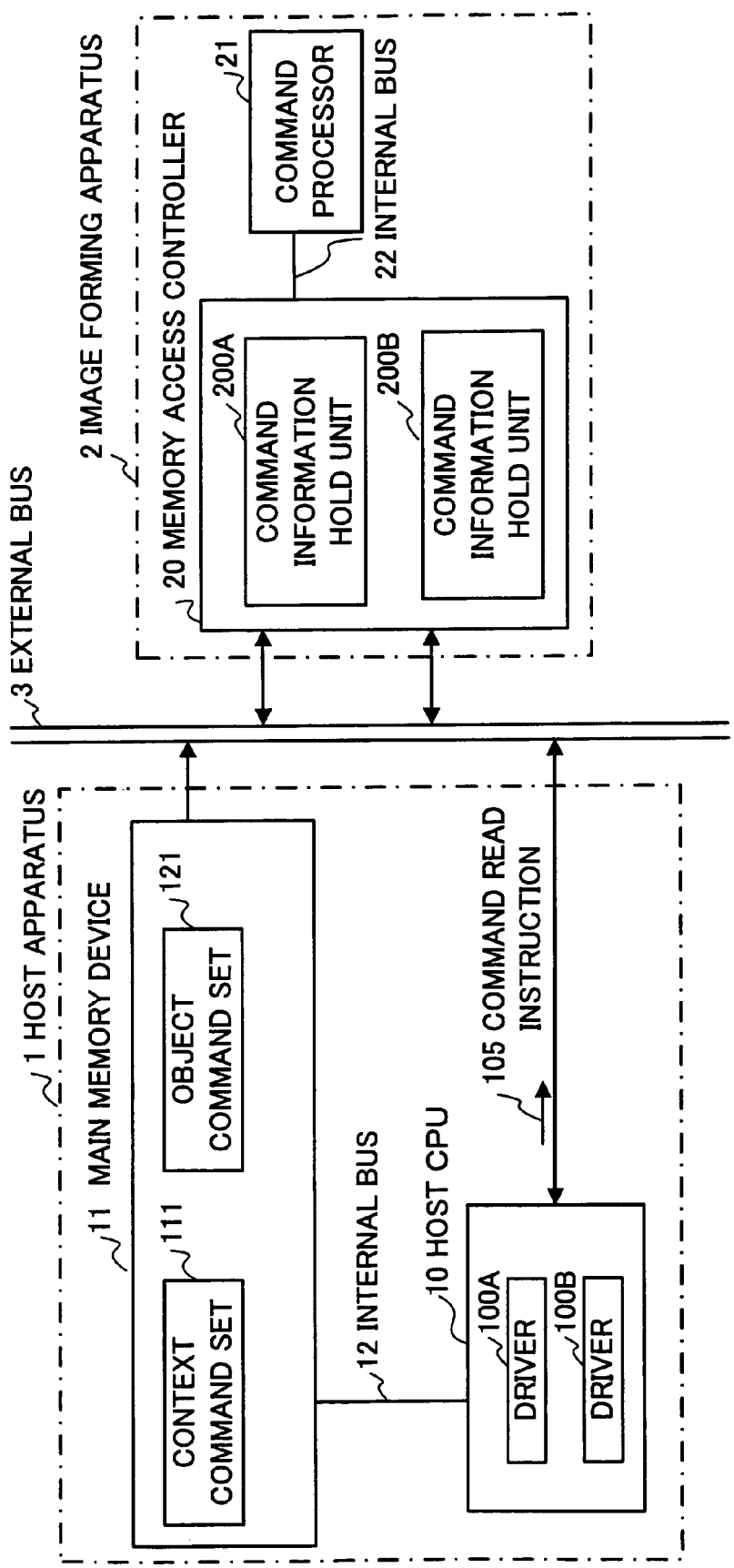
FIG. 9 is a diagram showing the general configuration of a data transfer system according to a second embodiment of the invention.

FIG. 9 is a diagram showing the general configuration of a data transfer system according to a second embodiment of the invention. The data transfer system according to the embodiment, like the data transfer system of the first embodiment (see FIG. 1), includes a host apparatus 1 and an image forming apparatus 2. In the data transfer system of the second embodiment, the host CPU 10 of the host apparatus 1 has two drivers (100A, 100B), and the memory access controller 20 of the image forming apparatus 2 has command information hold units (200A, 200B) respectively corresponding to those drivers.

Each of the drivers 100A and 100B, like the driver 100 in the first embodiment, has a command separate/storage unit 101 and a command read instruction transmission unit 102. The drivers 100A and 100B independently executes a command separation/storage process and a command read instruction transmission process to control the image forming apparatus 2.

Each of the command information hold unit 200A and the command information hold unit 200B of the memory access controller 20, like the command information hold unit 200 in the first embodiment, has an address hold section 201 and a command set hold section 202. The command information hold unit 200A holds data based on the command read instruction 105 from the driver 100A (i.e., address value of the context command set top address 131 and context command set 111 read from the main memory device 11).

The command information hold unit 200B holds data based on the command read instruction 105 from the driver 100B.

Figure 10:
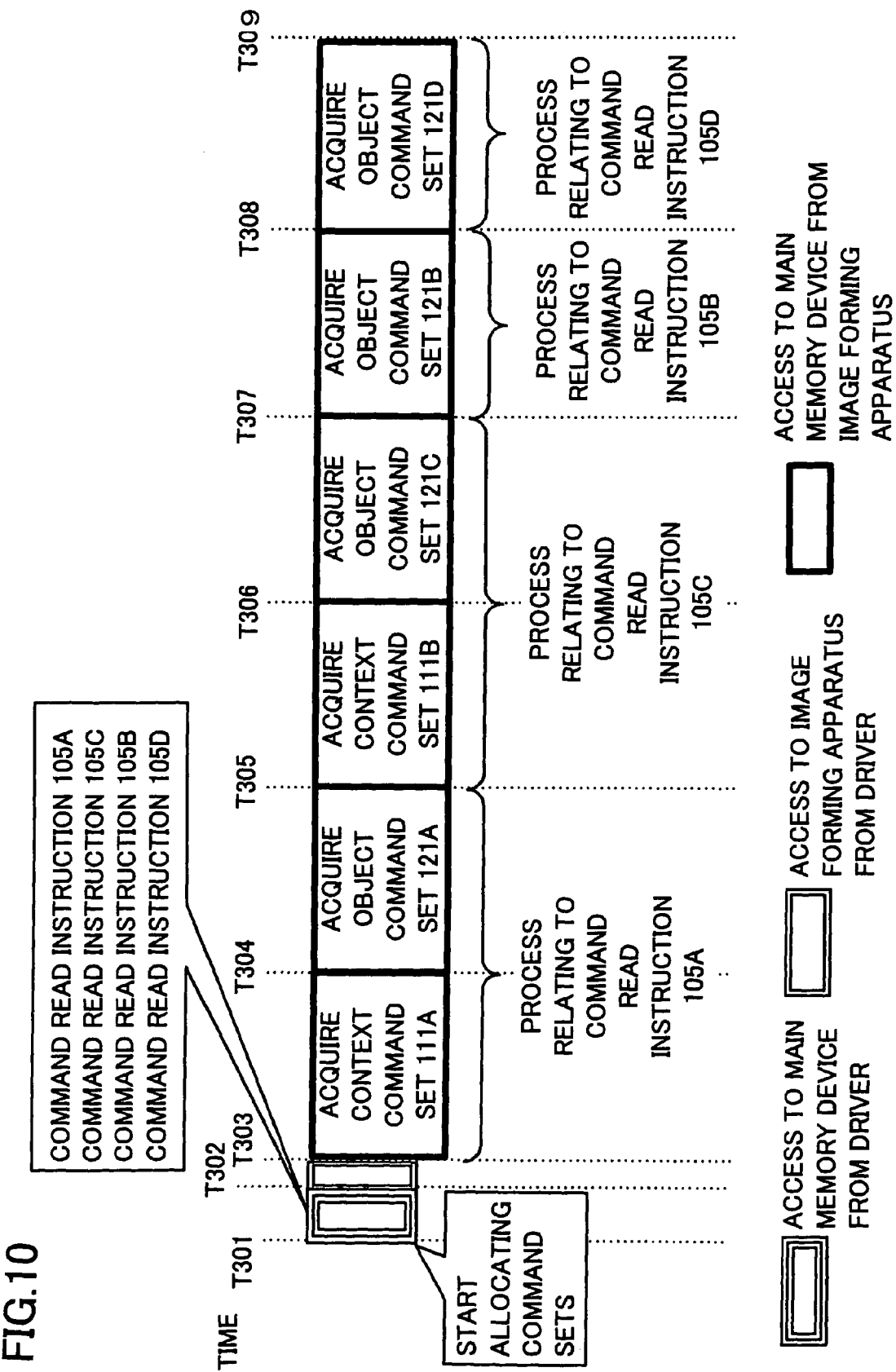
FIG. 10 is a timing chart for explaining transition of process states of a memory access control process according to the second embodiment of the invention.

FIG. 10 is a timing chart for explaining transition of process states of the memory access control process that is executed by the memory access controller 20 according to the second embodiment by way of specific example. Referring to FIG. 10, the command separate/storage unit 101 of each of the driver 100A and the driver 100B starts allocating command sets in the main memory device 11 at time T301 and completes the allocation at time T302.

Figure 11:
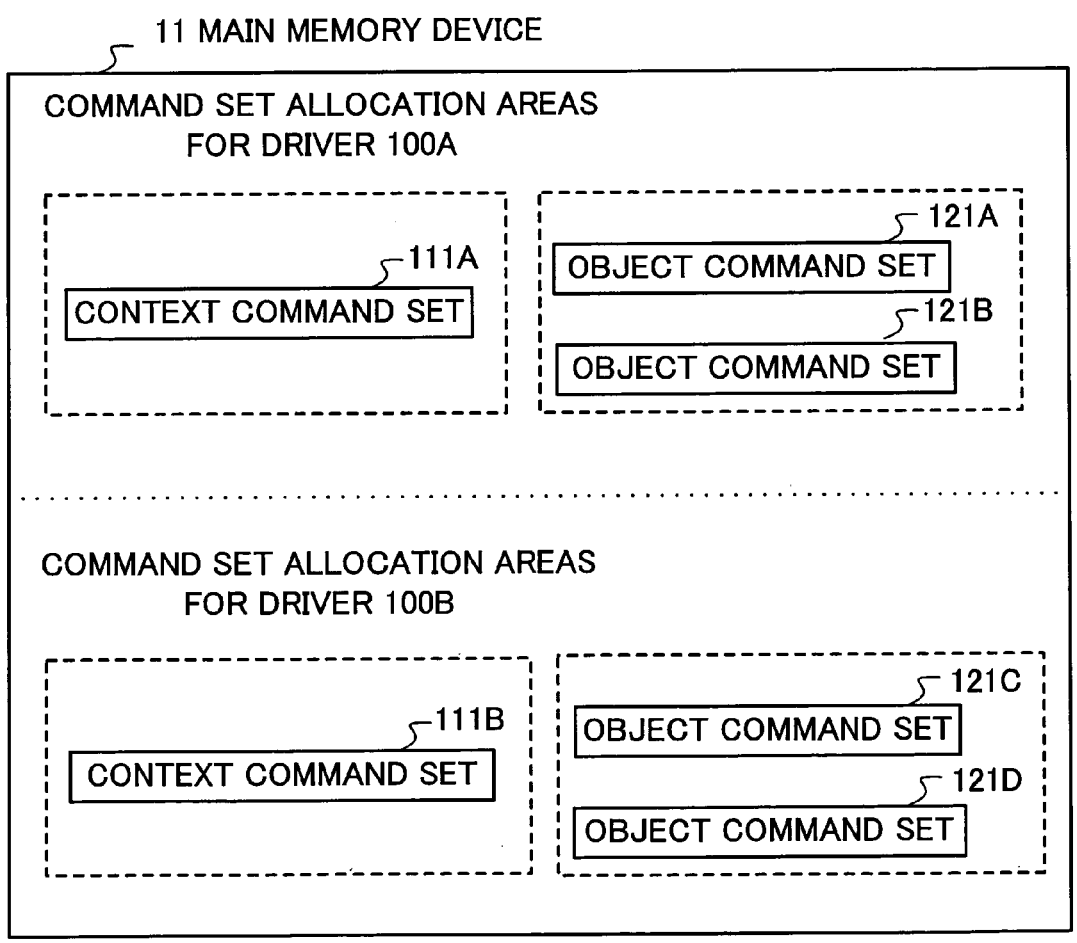
FIG. 11 is a diagram showing one example of allocation of command sets in a main memory device according to the second embodiment.

FIG. 11 shows how command sets are allocated in the main memory device 11 at the end of allocation of the command sets (T302) in the specific example. As shown in FIG. 11, a context command set 111A, an object command set 121A and an object command set 121B are allocated in the respective command set allocation areas in the main memory device 11 for the driver 100A by the command separate/storage unit 101 of the driver 100A. A context command set 111B, an object command set 121C and an object command set 121D are allocated in the respective command set allocation areas in the main memory device 11 for the driver 100B by the command separate/storage unit 101 of the driver 100B.

Figure 12A:
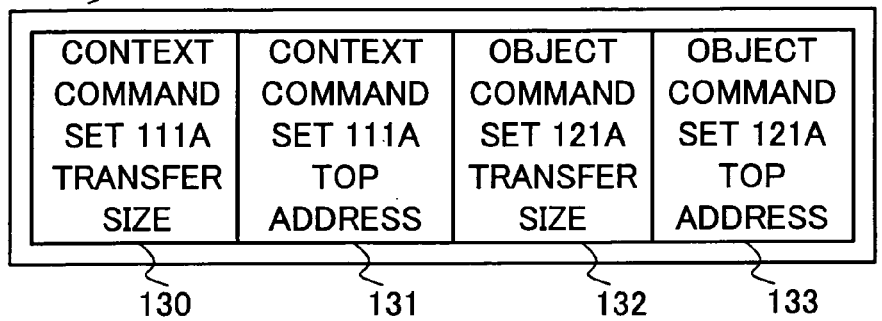
FIGS. 12A to 12D are diagrams showing one example of the structure of a command read instruction according to the second embodiment.
Figure 12B:
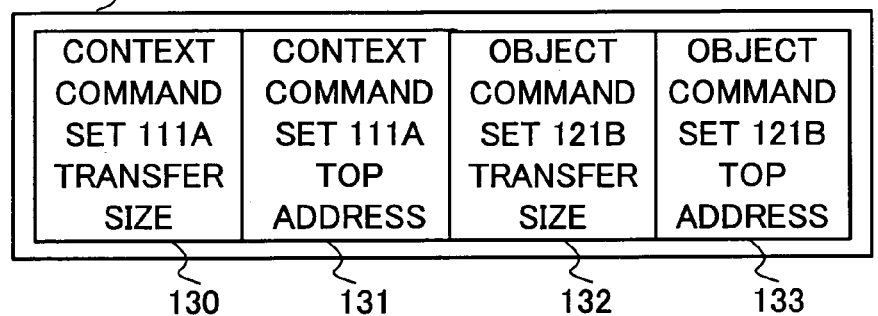
Figure 12C:
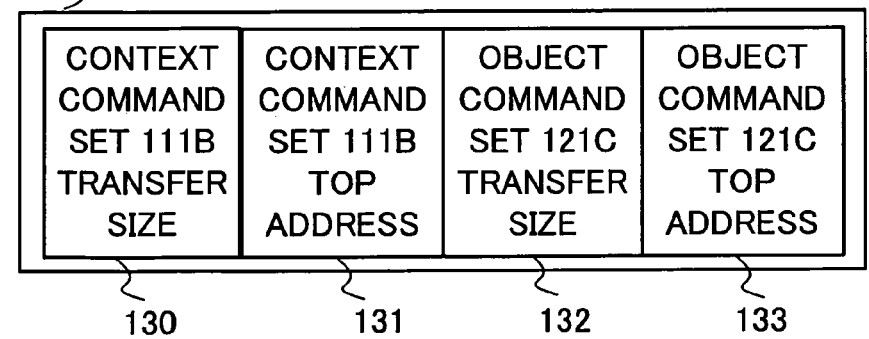
Figure 12D:
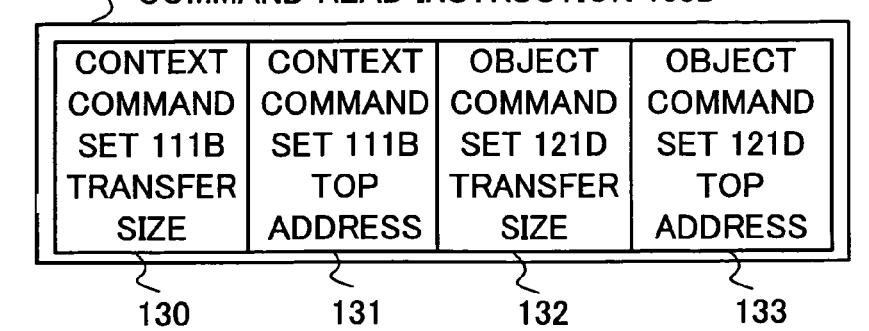

The command read instruction transmission unit 102 of each of the drivers 100A and 100B starts issuing a command read instruction 105 to the image forming apparatus 2 at time T302. In the allocation shown in FIG. 11, the command read instruction transmission unit 102 of the driver 100A issues a command read instruction 105A shown in FIG. 12A to the image forming apparatus 2, and then issues a command read instruction 105B shown in FIG. 12B thereto. At approximately the same timing, the command read instruction transmission unit 102 of the driver 100B issues a command read instruction 105C shown in FIG. 12C, and then issues a command read instruction 105D shown in FIG. 12D.

Figure 13:
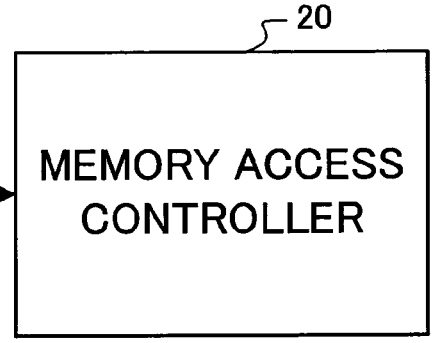
FIG. 13 is a diagram showing the order of arrival of command read instructions at a memory access controller according to the second embodiment.

The individual command read instructions 105 (105A to 105D) issued approximately at the same time by the command read instruction transmission units 102 of the drivers 100A and 100B in the foregoing manner reach the memory access controller 20 in an order, for example, as shown in FIG. 13. As shown in FIG. 13, in this example, the command read instruction 105A reaches the memory access controller 20 first, then the command read instruction 105C, the command read instruction 105B, and the command read instruction 105D reach the memory access controller 20 of the image forming apparatus 2 in order.

The memory access controller 20 starts a process relating to the command read instruction 105A at time T303. The memory access controller 20 first acquires an address value indicated by the context command set top address 131 in the command read instruction 105A (i.e., top address of the context command set 111A) as the current address value. Then, the memory access controller 20 acquires the address value (previous address value) held in the address hold section 201 of the command information hold unit 200A corresponding to the driver 100A, and compares the address value with the current address value.

The memory access controller 20 discriminates the type of the sender driver using unillustrated information (driver discrimination flag) included in the command read instruction 105. For example, the driver discrimination flag of "0" indicates the driver 100A, and the driver discrimination flag of "1" indicates the driver 100B.

Because the command read instruction 105A is the first command read instruction issued by the driver 100A, both address values do not match each other in the comparison. Therefore, the memory access controller 20 accesses the main memory device 11 to read the context command set 111A. The memory access controller 20 stores the read context command set 111A in the command set hold section 202 of the command information hold unit 200A, and stores the current address value in the address hold section 201 thereof. When reading of the context command set 111A is completed (time T304), the memory access controller 20 access the main memory device 11 to read the object command set 121A.

When the process relating to the command read instruction 105A is completed (time T305), the memory access controller 20 starts a process relating to the command read instruction 105C. The memory access controller 20 first acquires an address value indicated by the context command set top address 131 in the command read instruction 105C (i.e., top address of the context command set 111B) as the current address value. Then, the memory access controller 20 acquires the address value (previous address value) held in the address hold section 201 of the command information hold unit 200B corresponding to the driver 100B, and compares the address value with the current address value.

In this case, the command read instruction 105C is the first command read instruction issued by the driver 100B, so that both address values do not match each other. Therefore, the memory access controller 20 accesses the main memory device 11 to read the context command set 111B. The memory access controller 20 stores the read context command set 111B in the command set hold section 202 of the command information hold unit 200B, and stores the current address value in the address hold section 201 thereof. When reading of the context command set 111B is completed (time T306), the memory access controller 20 access the main memory device 11 to read the object command set 121C.

When the process relating to the command read instruction 105C is completed (time T307), the memory access controller 20 starts a process relating to the command read instruction 105B. An address value indicated by the context command set top address 131 in the command read instruction 105B (i.e., top address of the context command set 111A) matches with the storage address where the context command set 111A read in the process relating to the command read instruction 105A is stored. In this process, therefore, the memory access controller 20 does not read the context command set 111A, and reads only the object command set 121B from the main memory device 11.

When the process relating to the command read instruction 105B is completed (time T308), the memory access controller 20 starts a process relating to the command read instruction 105D. An address value indicated by the context command set top address 131 in the command read instruction 105D (i.e., top address of the context command set 111B) matches with the storage address where the context command set 111B read in the process relating to the command read instruction 105C is stored. In this process, therefore, the memory access controller 20 does not read the context command set 111B, and reads only the object command set 121D from the main memory device 11.

It is to be understood from the foregoing specific example that the data transfer system having a plurality of drivers (100A, 100B) according to the second embodiment can efficiently transfer command sets (context command set 111, object command set 121) for controlling the image forming apparatus 2 to the image forming apparatus 2 from the host apparatus 1.

The present invention is not limited to the foregoing embodiments, and can of course be modified in various forms without departing from the broad spirit and scope of the invention.

For example, the processes relating to the command read instruction 105 which are carried out by the memory access controller 20 may be executed not only in the order of arrival at the memory access controller 20, but also according to a predetermined priority. In this case, information (priority information) indicating the priority of each process is added to the command read instruction 105, so that the memory access controller 20 can perform the process of reading command sets according to the priority information.

Other preferable modifications of the present invention include the following configurations.

In the data transfer system according to the first aspect of the present invention, the host apparatus preferably has a driver having the command separate/storage unit and the command read instruction transmission unit.

It is preferable that the host apparatus should have a plurality of drivers, and the memory access controller of the image forming apparatus should have a plurality of command information hold units respectively corresponding to the plurality of drivers.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-171242 filed on Jun. 28, 2007 and including specification, claims, drawings and summary. The disclosure of the above Japanese Patent Application is incorporated herein by reference in its entirety,

What is claimed is:

1. A data transfer system having a host apparatus and an image forming apparatus connected thereto by a bus,
   the host apparatus including:
   a memory device;
   a command separate/storage unit that separates an image forming command set, which is a set of a plurality of context commands relating to setting of an operation mode needed for image forming and object commands for specifying an image forming target, into a context command set including a plurality of context commands contained in the image forming command set, and an object command set including a plurality of object commands contained in the image forming command set, and stores the context command set and the object command set in the memory device; and
   a command read instruction transmission unit that transmits a command read instruction including a transfer size of each of the context command set and the object command set, and a storage address thereof in the memory device to the image forming apparatus,
   the image forming apparatus including a memory access controller that receives the command read instruction, and reads the context command set and the object command set from the memory device according to a content of the command read instruction,
   the memory access controller having a command information hold unit that holds the storage address of the context command set included in the command read instruction received, and the read context command set,
   wherein the memory access controller is configured to compare the storage address of the context command set included in the command read instruction with a storage address of a previous context command set held in the command information hold unit, and read the context command set from the memory device according to the storage address of the context command set relating to present reception when both of the storage addresses differ from each other, and not read the context command set when the storage addresses are the same.

2. The data transfer system according to claim 1, wherein the host apparatus has a driver that includes the command separate/storage unit and the command read instruction transmission unit.

3. The data transfer system according to claim 2, wherein the host apparatus has a plurality of drivers, and
   the memory access controller of the image forming apparatus has a plurality of command information hold units respectively corresponding to the plurality of drivers.

4. A data transfer method for controlling data transfer between a host apparatus and an image forming apparatus connected together by a bus, the method comprising:
   a command separate/storage step of separating an image forming command set, which is a set of a plurality of context commands relating to setting of an operation mode needed for image forming and object commands for specifying an image forming target, into a context command set including a plurality of context commands contained in the image forming command set, and an object command set including a plurality of object commands contained in the image forming command set, and storing the context command set and the object command set in the memory device which the host apparatus includes;

a command read instruction transmission step of transmitting a command read instruction including a transfer size of each of the context command set and the object command set, and a storage address thereof in the memory device to the image forming apparatus; and a memory access control step of receiving the command read instruction, and reading the context command set and the object command set from the memory device according to a content of the command read instruction, wherein the memory access control step includes, comparing the storage address of the context command set included in the command read instruction with a storage address of a previous context command set included in a command read instruction received previously, the context command set being read from the memory device according to the storage address of the context command set relating to present reception when both of the storage addresses differ from each other, and the context command set not being read when the storage addresses are the same.

5. A host apparatus including:

a memory device;

a command separate/storage unit, connected to the host apparatus by a bus, that separates an image forming command set, which is a set of a plurality of context commands relating to setting of an operation mode needed for image forming and object commands for specifying an image forming target, into a context command set including a plurality of context commands contained in the image forming command set, and an object command set including a plurality of object commands contained in the image forming command set, and stores the context command set and the object command set in the memory device; and a command read instruction transmission unit that transmits a command read instruction including a transfer size of each of the context command set and the object command set, and a storage address thereof in the memory device to the image forming apparatus.

6. An image forming apparatus including:

a memory access controller that receives a command read instruction from a host apparatus connected to the image forming apparatus by a bus, and reads a context command set, which is a set of a plurality of commands relating to setting of an operation mode needed for image forming, and an object command set, which is a set of a plurality of commands for specifying an image forming target, from a memory device provided in the host apparatus according to a content of the command read instruction, the command read instruction including a transfer size of each of the context command set and the object command set, and a storage address thereof in the memory device, the memory access controller having a command information hold unit that holds the storage address of the context command set included in the command read instruction received, and the read context command set, wherein the memory access controller is configured to compare the storage address of the context command set included in the command read instruction with a storage address of a previous context command set held in the command information hold unit, and read the context command set from the memory device according to the storage address of the context command set relating to present reception when both of the storage addresses differ from each other, and not read the context command set when the storage addresses are the same.

* * * * *